Aug. 4, 1953     E. O. LUNDE     2,647,473
CAR ROOF HATCH COVER OPERATING MECHANISM
Filed June 20, 1951     4 Sheets-Sheet 2

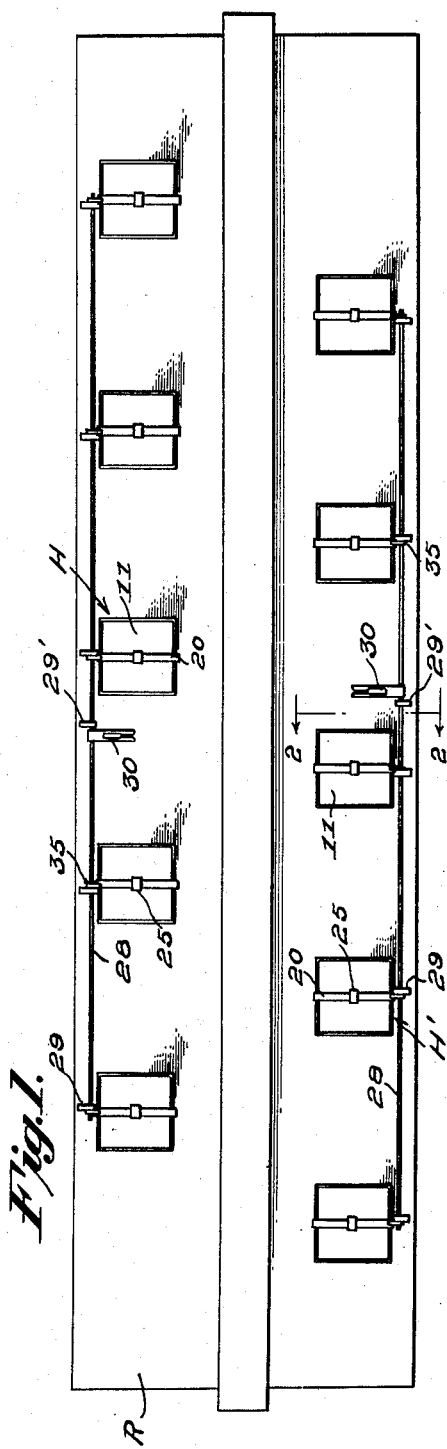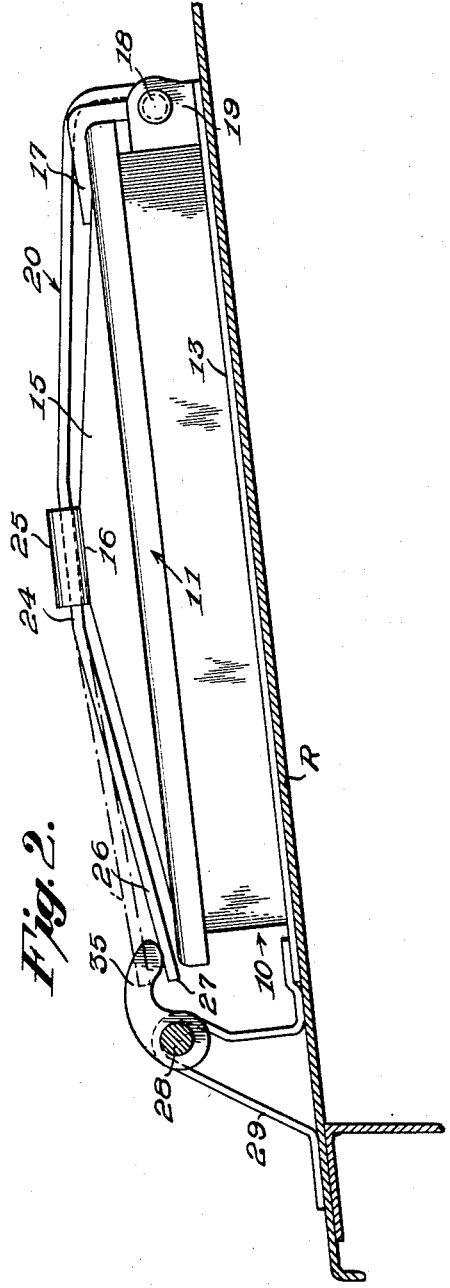

Inventor
Einar O. Lunde
George E. Cook
Attorney

Aug. 4, 1953     E. O. LUNDE     2,647,473
CAR ROOF HATCH COVER OPERATING MECHANISM
Filed June 20, 1951     4 Sheets-Sheet 3
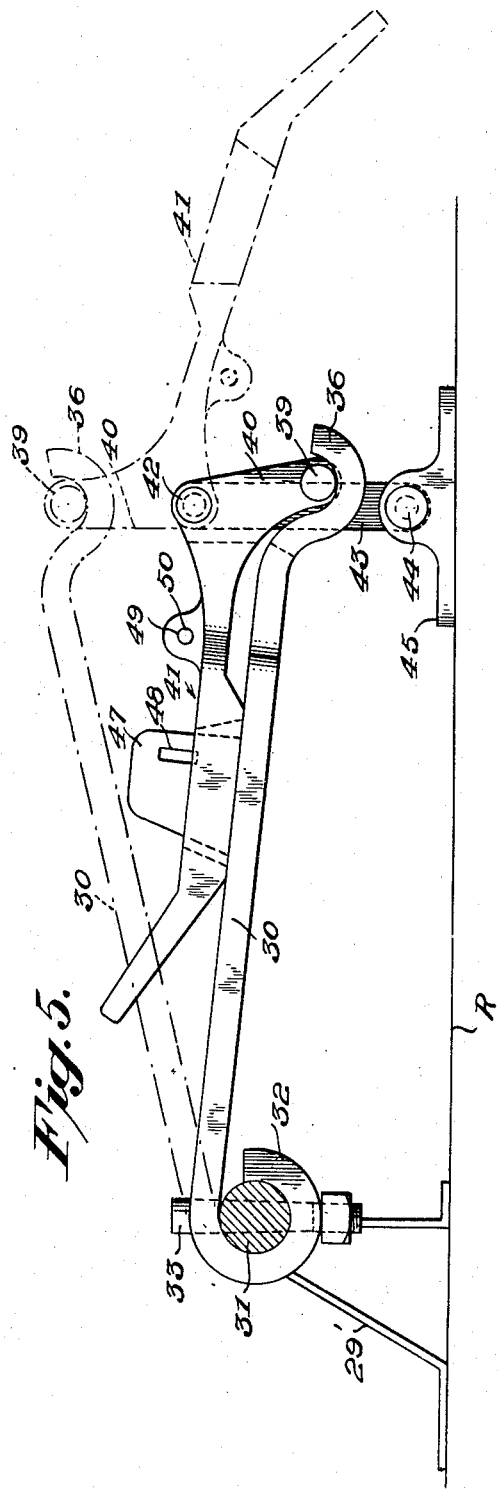
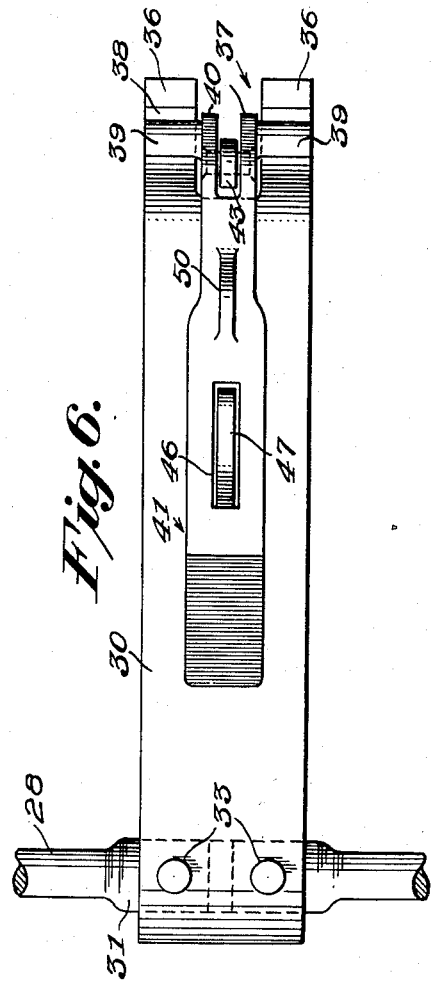
Inventor:
Einar O. Lunde
George E. Cook
Attorney Aug. 4, 1953  E. O. LUNDE  2,647,473
CAR ROOF HATCH COVER OPERATING MECHANISM
Filed June 20, 1951  4 Sheets-Sheet 4
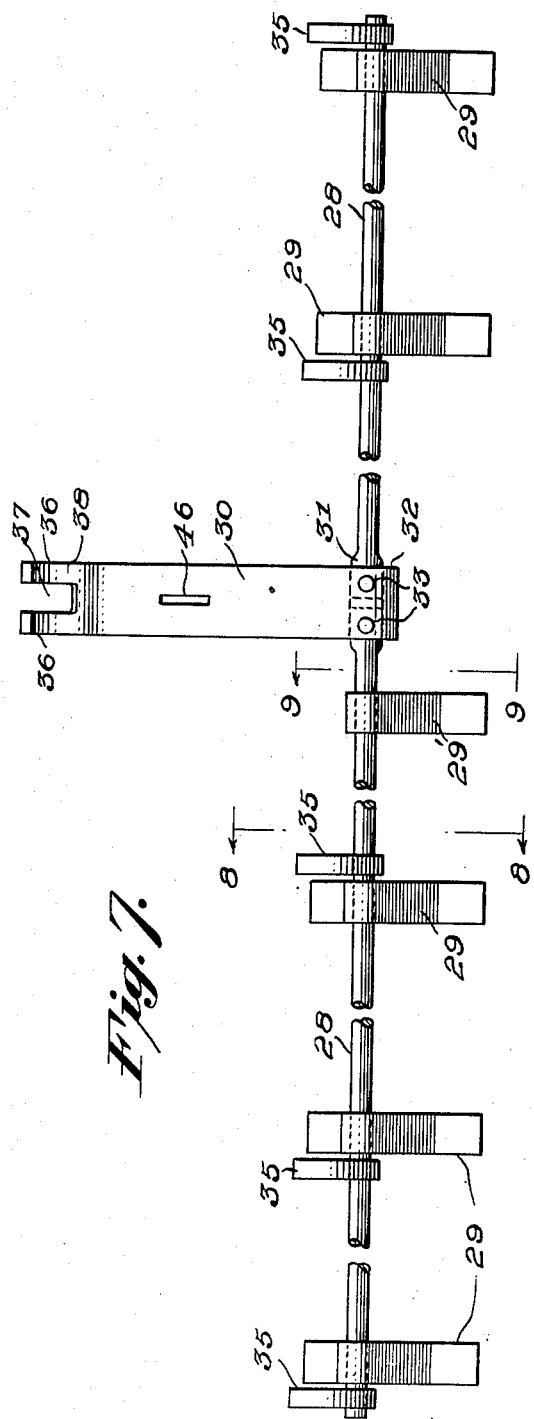
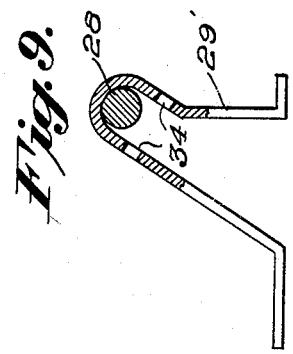
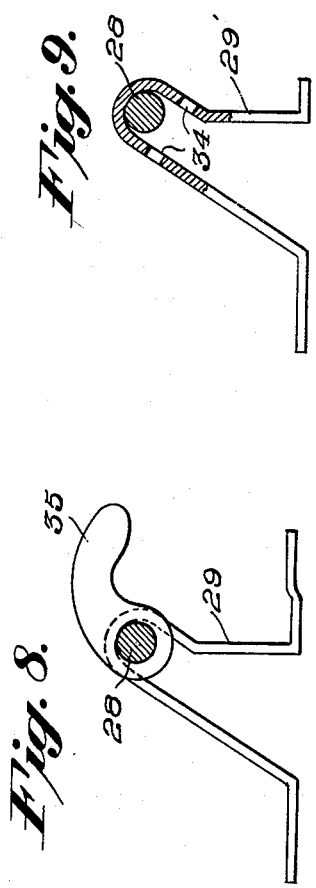
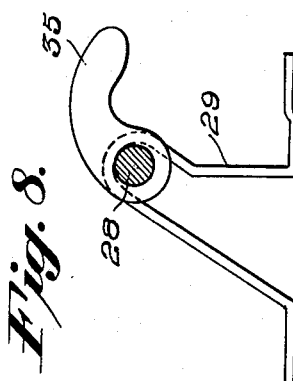
Inventor:
Einar O. Lunde
George E. Cook.
Attorney

Patented Aug. 4, 1953

2,647,473

UNITED STATES PATENT OFFICE 2,647,473

CAR ROOF HATCH COVER OPERATING MECHANISM

Einar O. Lunde, Wyckoff, N. J., assignor to Magor Car Corporation, New York, N. Y., a corporation of Delaware Application June 20, 1951, Serial No. 232,570

6 Claims. (Cl. 105—377)

1

This invention relates to a car roof hatch cover operating mechanism.

The invention is more particularly concerned with improved mechanism for yieldably closing the covers of a plurality of loading hatches in the roof of a car adapted to transport cement, grain, and the like.

A primary object of the invention is to provide in association with a hatch frame and cover therefor, of a resilient spring plate pivoted at one end thereof to the frame, spanning the cover intermediate its ends, and means for forcing the opposite end of the plate downwards with a resulting pressure on the cover adjacent its center thereof.

A further object of the invention is to provide resilient closing means for the pivoted covers of a plurality of car roof hatches and a single manually operable device for simultaneously closing all of the covers.

A still further object of the invention is to provide an improved hatch construction including a pressure member engageable spring plate cooperating with a cover pivoted to the frame of the hatch and which plate is also pivoted to the frame.

Other objects and advantages of the invention will become apparent in the course of the following detailed description, taken in connection with the accompanying drawings, wherein—

Fig. 1 is a top plan view of a car roof showing an application of the present invention, somewhat diagrammatically.

Fig. 2 is a transverse sectional view on a substantially enlarged scale in the plane of line 2—2 on Fig. 1.

Fig. 5 is a side elevational view of improved mechanism for simultaneously locking the covers of a plurality of hatches.

Fig. 6 is a top plan view of the structure shown in Fig. 5 with certain elements omitted for sake of clarity in illustration.

Fig. 7 is a broken top plan view of the means of one side of a car roof for simultaneously closing the covers of a plurality of hatches of said sides of the roof.

Fig. 8 is a vertical transverse section in the plane of line 8—8 on Fig. 7.

Fig. 9 is a vertical transverse section in the plane of line 9—9 on Fig. 7.

Referring now in detail to the drawings, and

2 first to Fig. 1, R designates a car roof and a series of hatches designated generally as H are disposed adjacent one side of the roof and a similar series of hatches H' are disposed adjacent the opposite side of the roof.

Figure 4:
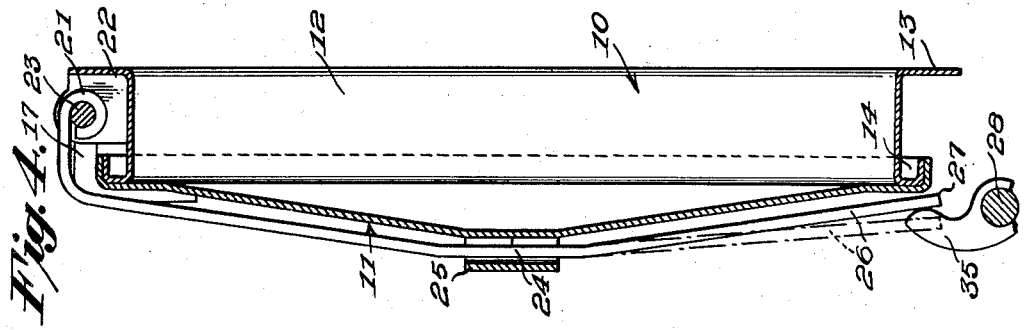
Fig. 4 is a vertical sectional view in the plane of line 4—4 on Fig. 3.
Figure 3:
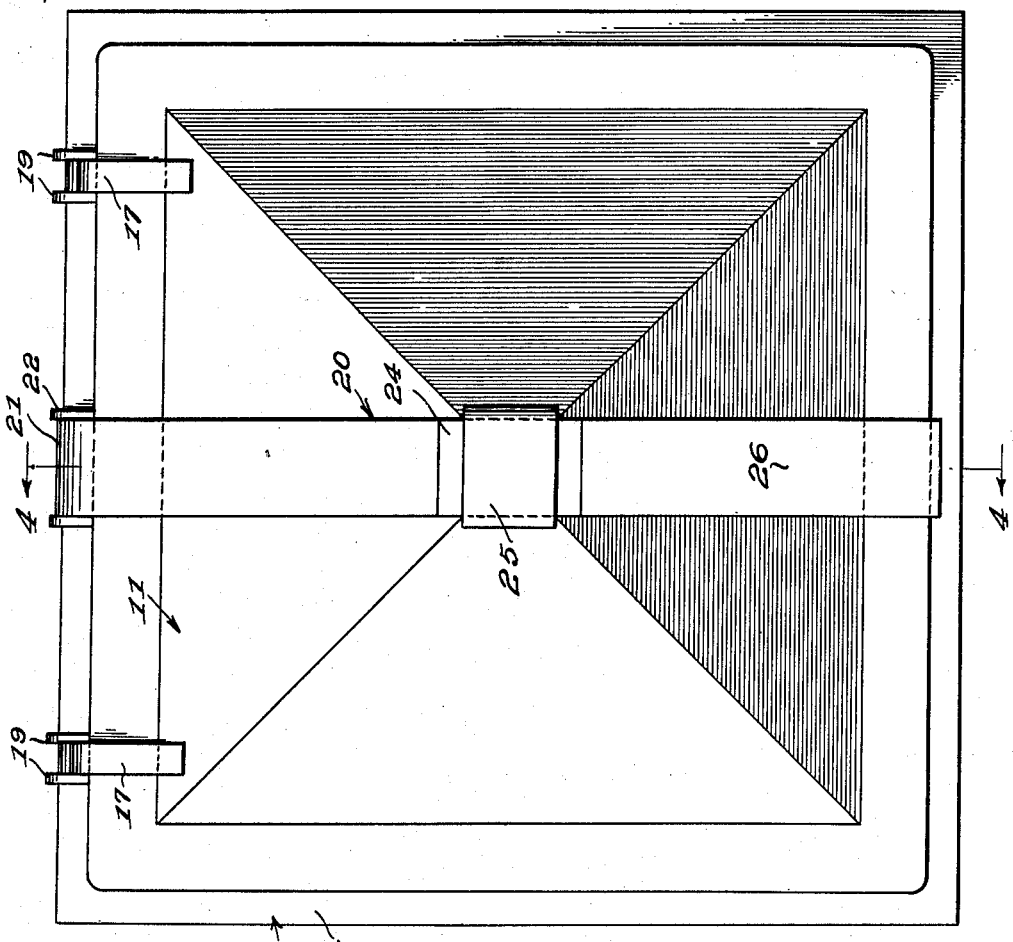
Fig. 3 is a top plan view of one of the improved hatches.

The hatches are all alike in construction and accordingly only one thereof will be described. Each hatch (Figs. 2, 3 and 4) comprises a frame 10 and a cover 11.

The frame 10 includes a generally rectangular body 12 adapted to surround an opening in the car roof R and a base attaching flange 13 projects laterally of the body. The body 12 is sealed as at 14 for engagement therewith of the flanged edge of the cover 11. The cover includes a truncated pyramidal top 15 providing a high central bearing portion 16.

The cover 11 is provided with hinge elements 17 pivoted at 18 in cooperating hinge elements 19 on the frame 10. An elongated resilient cover hold down strap 20 has one end thereof provided with an eye 21 which is pivoted to an element 22 on the frame by a suitable pintle 23. The strap is of angular formation in edge view and generally conforms to the top 15 and includes a central plane bearing portion 24 disposed within a guide member 25 supported on the central flat bearing portion 16.

The strap further includes a forward portion 26 having a free end 27 disposed adjacent the front edge of cover 11.

As indicated in Fig. 1, five hatches are disposed adjacent one side of the roof and five adjacent the opposite side.

A shaft 28 is disposed adjacent each side of roof R immediately in front of each series of hatches H and H'. Each shaft 28 is rotatably journalled in a plurality of bearings 29 suitably secured to the top surface of roof R.

A shaft operating lever bar 30 is connected to each shaft 28 which shaft preferably includes two sections whose adjacent ends are enlarged as at 31 and about which the rolled end 32 of shaft operating lever 30 is secured by pins 33. A bearing 29' similar to bearings 29 is disposed adjacent each lever bar 30 and the bearings, as indicated in Fig. 9 may each include a pair of apertures 34 for receiving a shaft confining pin.

Each shaft 28 is provided with a plurality of fingers 35, one for each hatch and which is engageable with the corresponding hold down strap 20. The straps are shown in dot-and-dash lines in Fig. 2 in their normal non-stressed position and in full lines in their stressed cover hold down positions which is effected by the fingers 35 upon rotation of shafts 28.

The manner in which the shafts 28 are rotated for corresponding movement of the strap stressing fingers 35 may be better understood upon referring to Figs. 5 and 6 wherein it will be seen that the shaft rotating lever bar 30 has a bifurcated free end providing forks 36 and a recess 37 therebetween. The forks 36 each has an upwardly facing concave seat 38 in which freely ride a pair of axially alined cylindrical pins 39 projecting laterally from the lower ends of arms 40 on the forward end of a locking bar 41.

The locking bar is pivotally connected at 42 to the upper end of a generally vertical link 43 which extends downwardly from pivotal connection 42 between arms 40 and through the recess 37 and the lower end of the link is pivotally connected at 44 to a bracket 45 suitably secured to the car roof R.

The locking bar 41 is provided with a slot 46 through which extends a projection 47 on the lever bar 30 and which projection is provided with an aperture 48 through which a locking chain may be extended as well as through an aperture 49 in a lug 50 on the locking bar 41.

In Fig. 5 the parts are shown in dot and dash lines in their inoperative positions when no stress is placed on the hatch cover hold down straps 20 and substantially corresponds to the dot-and-dash position of the strap in Fig. 2.

When it is desired to force the straps down into cover closing position, the locking bar 41 is swung counter-clockwise about pivot 42 and the pins 39 riding in seats 38 will force lever bar 30 downwardly with a corresponding rotation of shaft 28 and clockwise rotation of strap engaging fingers 35. When the parts are in the full line position of Fig. 5, pins 39 will be past the dead center line connecting pivots 42 and 44 and the structure will be in locked position.

In order to open the hatch covers, the fingers 35 must be swung clear of the free ends of the straps 20 and to provide for such the shaft operating bar 30 and locking bar 41 are disengaged at the cooperating portions 36 and 39. This is effected by forcing lever bar 30 (dot-and-dash position in Fig. 5) downwardly sufficiently to permit pins 39 to ride over the forks 36 upon further downward movement of locking bar 41 from its dot-and-dash position in Fig. 5.

While I have disclosed my invention in accordance with a single specific structural embodiment thereof, such is to be considered as illustrative only, and not restrictive, the scope of the invention being defined in the sub-joined claims.

What I claim and desire to secure by United States Letters Patent is:

1. In combination with a plurality of hatches each including a frame and a cover pivotally connected thereto, a resilient strap spanning said cover and having one end pivotally connected to said frame, and manually operable means engageable with the free ends of said straps for simultaneously forcing the straps of said plurality of hatches down into closing engagement with the covers thereof.

2. The structure according to claim 1, wherein said covers include raised central portions, said straps having their intermediate portions engageable with said raised portions, and generally tubular guides for said straps disposed upon said raised portions.

3. The structure according to claim 1, wherein said means comprises a shaft rotatably supported adjacent the free edges of said covers, strap engaging fingers secured to said shaft, and a lever bar connected to said shaft for rotating same and urging said fingers into strap deflecting position.

4. The structure according to claim 3 together with a locking bar including a pair of downwardly extending arms, said lever bar having a bifurcated free end providing spaced forks and a recess therebetween, said forks having upwardly facing concave seats, a link disposed in said recess and between said arms, said link pivotally connected at its upper end to said locking bar and at its lower end to a fixed bracket and oppositely disposed pins projecting from said arms and disposed in said seats.

5. The structure according to claim 4 together with cooperating locking means on said lever bar and locking bar.

6. A hatch construction comprising a frame, a cover pivotally connected to the frame, the cover having a central raised portion, a resilient elongated strap of uniform thickness throughout its width and length spanning said cover and having one end thereof pivotally connected to said frame, the intermediate portion of said strap bearing on said raised portion and pivoted depressible means engageable with the free end of the strap.

EINAR O. LUNDE.

References Cited in the file of this patent

UNITED STATES PATENTS

| Number | Name | Date |
|---|---|---|
| 2,226,683 | Wolf et al. | Dec. 31, 1940 |
| 2,324,356 | Brown | July 13, 1943 |
| 2,408,733 | Campbell | Oct. 8, 1946 |
| 2,529,329 | De Frees | Nov. 7, 1950 |
| 2,572,963 | Wily | Oct. 30, 1951 |